United States Patent [19]
Sakurahara et al.

[11] Patent Number: 6,019,079
[45] Date of Patent: Feb. 1, 2000

[54] PISTON FOR INTERNAL COMBUSTION ENGINES

[75] Inventors: Kazuo Sakurahara; Hideki Saito; Kazuhiko Akutsu, all of Wako, Japan

[73] Assignee: Honda Giken Kogyo Kabushiki Kaisha, Tokyo, Japan

[21] Appl. No.: 09/126,767

[22] Filed: Jul. 31, 1998

[30] Foreign Application Priority Data

Aug. 1, 1997 [JP] Japan .................................. 9-221105

[51] Int. Cl.[7] ............................... F02B 23/08; F02F 3/24
[52] U.S. Cl. ........................................ 123/193.6; 123/661
[58] Field of Search ............................. 123/193.6, 193.5, 123/661, 671, 308

[56] References Cited

U.S. PATENT DOCUMENTS

| | | | |
|---|---|---|---|
| 4,586,465 | 5/1986 | Krogdahl | 123/193.6 |
| 4,706,623 | 11/1987 | Gadefelt et al. | 123/193.5 |
| 5,127,379 | 7/1992 | Kobayashi et al. | 123/661 |
| 5,285,755 | 2/1994 | Regueiro | 123/193.6 |
| 5,309,879 | 5/1994 | Regueiro | 123/193.6 |

*Primary Examiner*—Marguerite McMahon

*Attorney, Agent, or Firm*—Armstrong, Westerman, Hattori, McLeland and Naughton

[57] ABSTRACT

The object of the present invention is to concentrate the intake air flowing into a combustion chamber of an internal combustion engine near the ignition point of a spark plug, and to form a strong swirl effect in this area.

A projection 16 is formed on an end surface 5a of a piston 5. Projection 16 is positioned near an intake port disposed on one side of the upper surface of a combustion chamber. A cavity 17 is formed at a position closer to an exhaust port than projection 16. An ignition point of a spark plug is disposed above cavity 17. The intake port points toward the outer perimeter of the combustion chamber. The portion of projection 16 on piston end surface 5a that lies in the direction of the intake port is cut away. An intake flow passage 19 is formed on end surface 5a of piston 5, extending from a cut-away section 18 toward the exhaust port via the outer perimeter of piston end surface 5a. The end of intake flow passage 19 toward the exhaust port forms a cavity entry 20 through which intake air flows into the cavity 17. The intake air entering the combustion chamber from the intake port goes through cut-away section 18 of projection 16, through the outer perimeter portion of piston end surface 5a, and into cavity 17 from entry 20 toward the exhaust port. A swirling effect is formed in cavity 17.

28 Claims, 2 Drawing Sheets

PISTON FOR INTERNAL COMBUSTION ENGINES

BACKGROUND OF THE INVENTION

The present invention relates to an internal combustion engine that forms a swirl effect in a combustion chamber, where an intake port pointing toward the outer perimeter of the combustion chamber is disposed on one side of the upper surface of the combustion chamber. More specifically, the present invention relates to a piston used in this type of internal combustion engine.

In internal combustion engines, it has been known that generating a swirl effect in the combustion chamber can promote fuel mixing and flame propagation, thus improving combustion. For this reason, various means for creating swirl effects have been considered. In one example, an intake passage opening that guides intake air into a combustion chamber, i.e. an intake port, is positioned away from the center of the combustion chamber and is pointed toward the outer perimeter.

Also, internal combustion engines need to have the intake air concentrated near the ignition point of the spark plug. This is achieved by having a cavity formed on the end surface of the piston under the ignition point of the spark plug and by having a projection disposed on another section of the end surface. The projection generally extends laterally across the end surface of the piston so that it separates the intake port from the exhaust port, and is disposed near a section of the end surface that faces the intake port.

However, when a piston having this kind of projection is used with an internal combustion engine that creates the swirling described above, the projection obstructs the flow of the intake air coming into the combustion chamber from the intake port. This disrupts the flow and prevents a strong swirl effect from being created.

In Japanese Laid-Open Publication Number 62-178717, there is disclosed a piston having a projection disposed on the end surface of the piston. The projection is similar to the projection described above although it serves a different purpose. A cut-away section is formed on the projection at a position facing the intake port. A concave groove extending laterally is disposed on the end surface of the piston and is interposed between the section facing the intake port and the section facing the exhaust port. The cut-away section described above is directly continuous with this concave groove.

In internal combustion engines having this kind of piston, the intake air coming in from the intake port flows into the concave groove via the cut-away section of the projection. Thus, the projection is prevented from obstructing the flow of intake air. As a result, a swirl effect is created in the combustion space formed by the concave groove.

However, when a cut-away directly connected to the concave groove is formed in this manner on the projection on the piston end surface, the cut-away is positioned in the path of the swirling formed in the concave groove. Thus, the swirl that was generated is weakened by the cut-away.

OBJECTS AND SUMMARY OF THE INVENTION

The object of the present invention is to overcome the problem described above and to concentrate the intake air brought into the combustion chamber near the ignition point of the spark plug, as well as to generate strong swirling in this area.

In order to achieve these objects, the present invention has intake air flowing through a cut-away section formed on the projection on the piston end surface. The intake air flows over the outer perimeter portion of the piston end surface and flows into the cavity via a section facing the exhaust port.

In the piston for internal combustion engines according to the present invention, a projection is formed on the end surface of the piston at the section facing the intake port. The projection extends over the end surface, separating the intake port from the exhaust port. A cavity is disposed closer toward the exhaust port than the projection, at a position facing the ignition point of the spark plug. A section of said projection that lies along the orientation of said intake port is cut away. An intake flow passage is formed on the piston end surface to allow the intake air going through the cut-away section of the projection to flow from the outer perimeter portion of the combustion chamber to the cavity entry positioned near a section facing the exhaust port.

With this structure, the intake air flowing into the combustion chamber from the intake port passes through the cut-away section of the projection and flows over the outer perimeter portion of the piston end surface near the area facing the exhaust port, where it flows into the cavity via the cavity entry formed there. Thus, the intake air is not obstructed by the projection on the piston end surface and is able to flow smoothly, concentrating in the cavity near the ignition point of the spark plug. The intake air then forms swirls in the cavity. Since the cut-away section of the projection is disposed away from the cavity, the swirling formed in the cavity is not weakened by the cut-away section. Thus, a strong swirling effect is provided.

It would be desirable for the cavity to be formed in a substantially circular shape when seen from above, and it would be desirable for the cavity entry of the intake flow passage to be oriented along a tangent line of the circular cavity. This would provide an even stronger swirling effect in the cavity.

Furthermore, it would also be desirable for the section of the piston end surface that serves as the bottom surface of the intake flow passage to be formed as a flat surface from the cut-away section of the projection to the cavity entry. This prevents the intake flow along the intake flow passage from becoming disturbed, thus preventing the swirling from being weakened.

Furthermore, it would be desirable for the cut-away section of the projection to be extended to the outer perimeter edge of the piston end surface. This prevents the intake flow there from being disturbed by squishing.

The piston can be used in internal combustion engines with two intake ports comprising a first intake port having an intake valve that is always active and a second intake port having an intake valve that is at rest under light loads. In this case, a partition wall separates first and second intake passages connected to the first and second intake ports respectively. A connecting aperture is formed on the partition wall to make the intake passages continuous. The cut-away section of the projection disposed on the piston end surface is positioned so that it is positioned in the direction of the intake flow coming from the connecting aperture. This provides a stronger swirling effect in the combustion chamber.

The above, and other objects, features and advantages of the present invention will become apparent from the following description read in conjunction with the accompanying drawings, in which like reference numerals designate the same elements.

Figure 1:
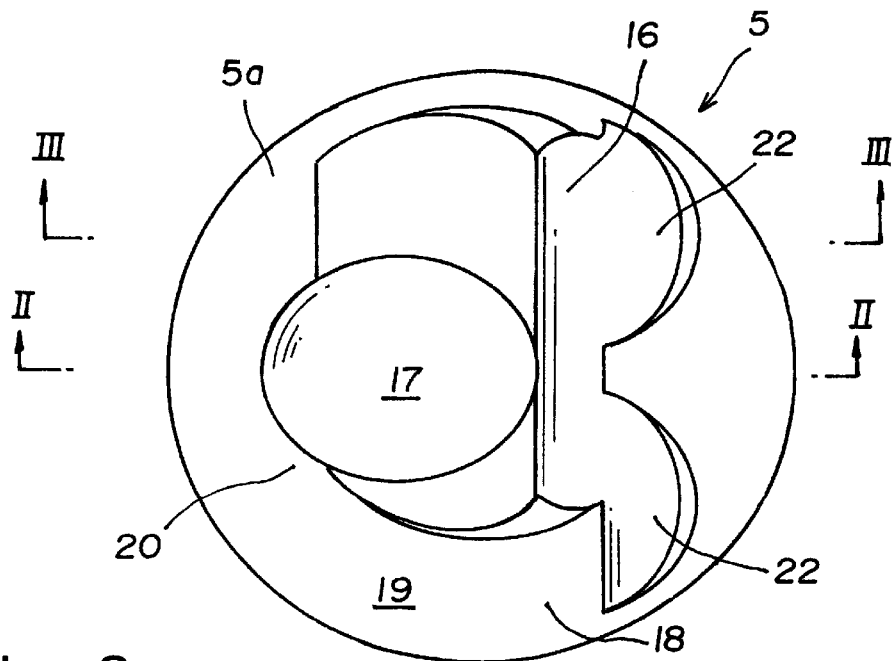
FIG. 1 is a plan drawing of a piston end surface showing one example of a piston for internal combustion engines according to the present invention.

DESCRIPTION OF THE NUMERALS 1 combustion chamber
2 cylinder block
3 cylinder head
3a, 3b roof surface (upper surface of combustion chamber)
5 piston
5a piston end surface
61 first intake port
62 second intake port
71, 72 exhaust port
81 first intake valve
82 second intake valve
10 spark plug
11 ignition point of spark plug
121 first intake passage
122 second intake passage
14 partition wall
15 connecting aperture
16 projection
17 cavity
18 cut-away section
19 intake flow passage
20 cavity entry

DETAILED DESCRIPTION OF THE PREFERRED EMBODIMENTS

Referring to the drawings, the following is a description of the embodiments of the present invention.

Figure 2:
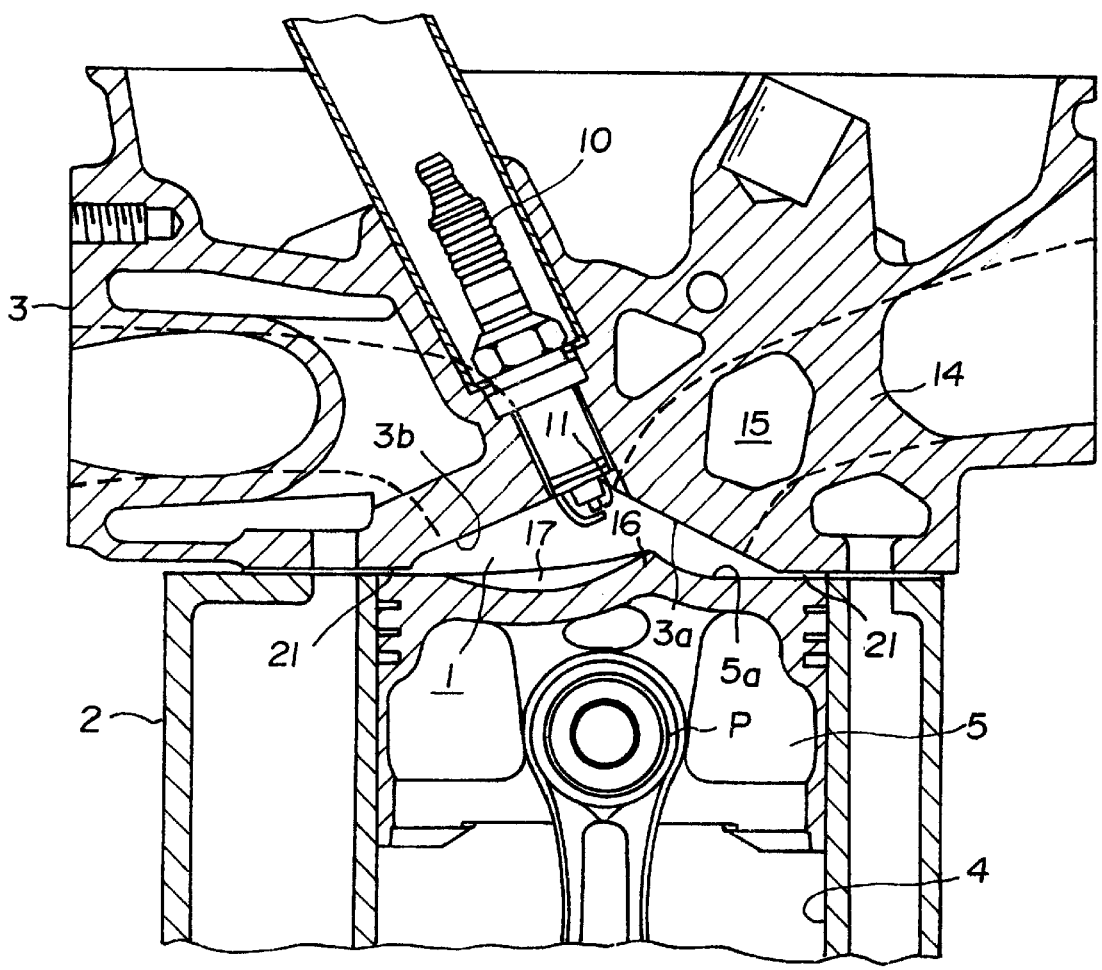
FIG. 2 is a vertical cross-section drawing along the II—II line in FIG. 1 showing an example of an internal combustion engine in which the piston is used.
Figure 3:
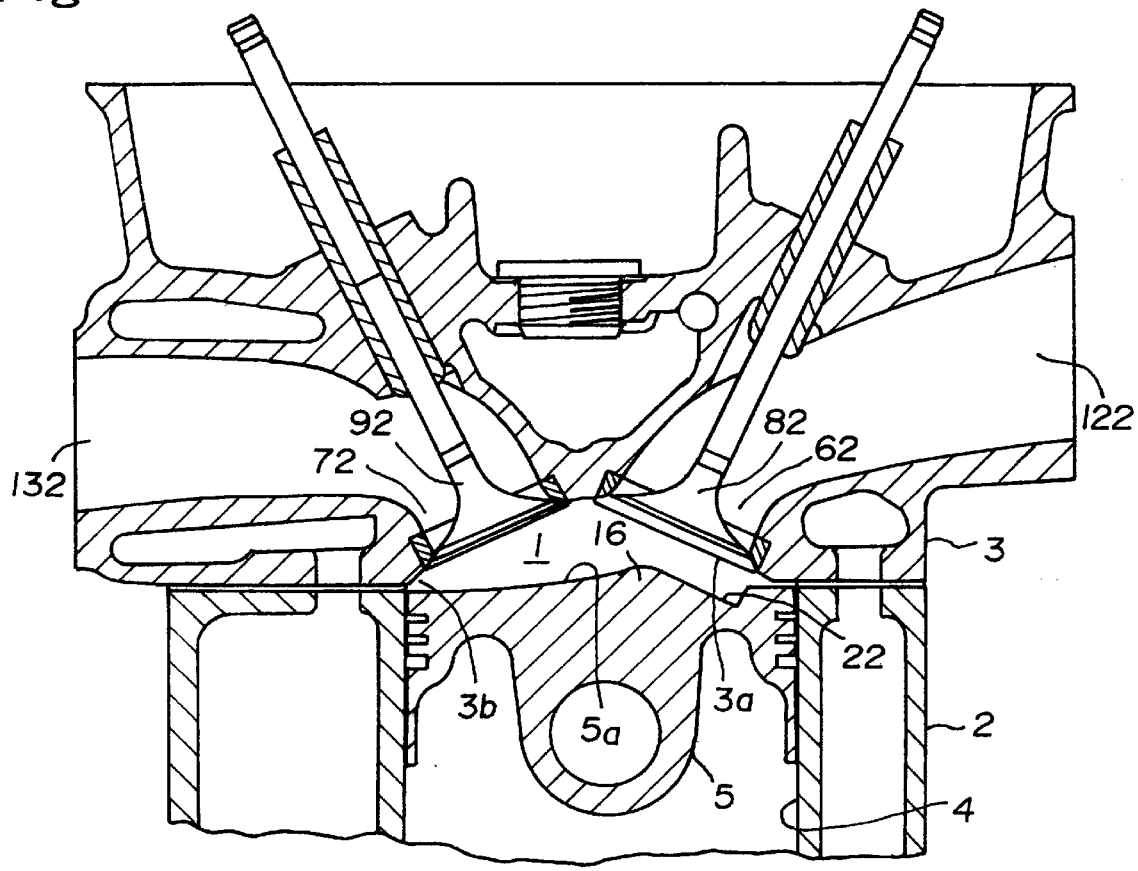
FIG. 3 is a vertical cross-section drawing of the internal combustion engine along the III—III line in FIG. 1.
Figure 4:
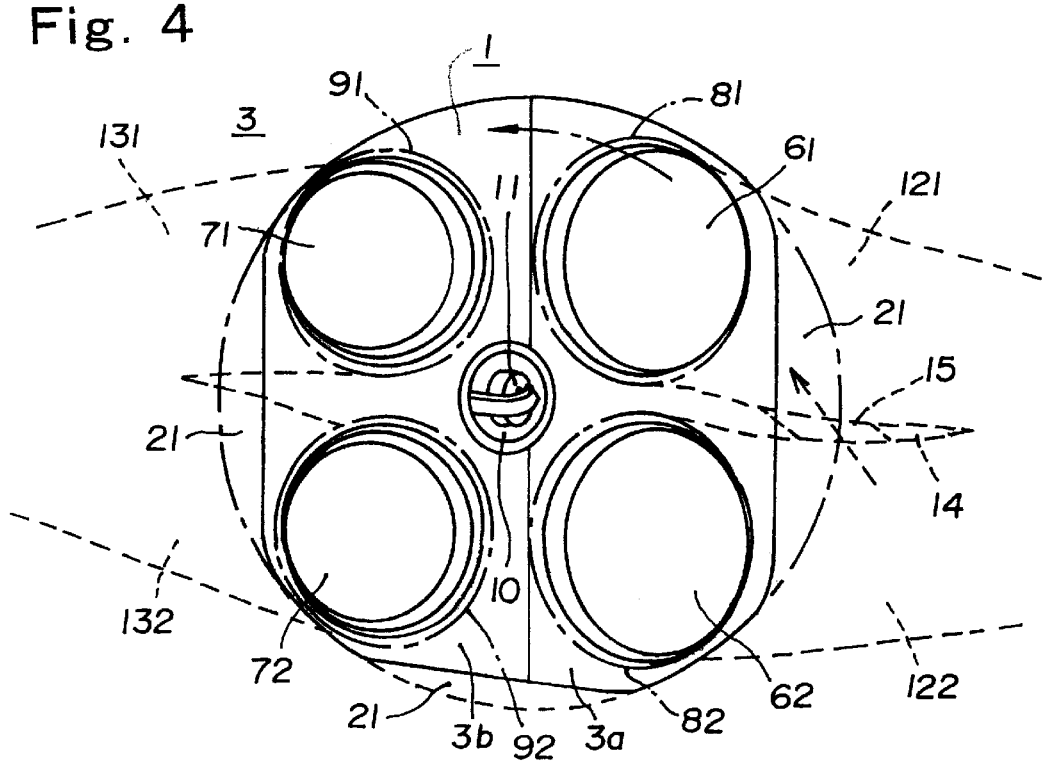
FIG. 4 is a bottom-view drawing of the cylinder head that forms the upper surface of the combustion chamber in the internal combustion engine.

The drawings show one example of a piston for internal combustion engines according to the present invention. FIG. 1 is a plan drawing of the end surface of the piston. FIG. 2 and FIG. 3 are vertical cross-section drawings of an internal combustion engine in which the piston is used. FIG. 4 is a bottom-view drawing of a cylinder head, that forms the upper surface of the combustion chamber of the internal combustion engine.

As FIG. 2 and FIG. 3 show, the internal combustion engine is a gasoline engine for automobiles and includes a roof-shaped combustion chamber 1. Combustion chamber 1 is defined by: the bottom surface of a cylinder head 3 attached to the top of a cylinder block 2; an inner surface of a cylinder bore 4 disposed in cylinder block 2; and an end surface 5a of a piston 5, which is slidably fitted in cylinder bore 4. The bottom surface of cylinder head 3, which forms the upper surface of combustion chamber 1, includes a pair of roof surfaces 3a, 3b sloping to the left and right respectively. Roof surfaces 3a, 3b are positioned so that they face cylinder bore 4.

As shown in FIG. 4, a first intake port 61 and a second intake port 62 are disposed side by side on roof surface 3a. On roof surface 3b are disposed exhaust ports 71, 72. First and second intake ports 61, 62 are opened and closed by first and second intake valves 81, 82 respectively. Exhaust ports 71, 72 are opened and closed by exhaust valves 91, 92 respectively. An ignition point 11 of a spark plug 10 is disposed at a central section of the upper surface of combustion chamber 1.

On cylinder head 3 there are disposed a first intake passage 121 and a second intake passage 122 which connect to first intake port 61 and second intake port 62 respectively. On cylinder head 3 there are also disposed exhaust passages 131, 132, which connect to exhaust ports 71, 72 respectively. The end of first intake passage 121, i.e., the portion adjacent to first intake port 61, is formed arcuate so that it points substantially in the direction of the tangent of the outer perimeter of combustion chamber 1. Thus, the intake air flowing from first intake port 61 into combustion chamber 1 is made to flow toward the outer perimeter of combustion chamber 1.

First intake valve 81, which opens and closes first intake port 61, is always active, in the same manner as standard intake valves. Second intake valve 82, which opens and closes second intake port 62, is inactive when the engine has a light load. A partition wall 14 is formed between first and second intake passages 121, 122. A connecting aperture 15 provides continuity between intake passages 121, 122 and guides the intake air flowing through second intake passage 122 into first intake passage 121 when second intake valve 82 is at rest. The intake air that flows through connecting aperture 15 is oriented in substantially the same direction as the intake air flowing into combustion chamber 1 from first intake port 61.

As FIG. 1 through FIG. 3 show, a projection 16 is formed at an end surface 5a of piston 5. Projection 16 is positioned slightly away from the center toward the side under intake ports 61, 62. The ridge of projection 16 extends across end surface 5a so as to separate intake ports 61, 62 from exhaust ports 71, 72, and is substantially parallel to the axis of a piston pin p. A cavity 17 is disposed on end surface 5a at the base of projection 16 toward the side under exhaust ports 71, 72. The bottom of cavity 17 is formed as a spherical surface. As the plan drawing in FIG. 1 shows, cavity 17 has a substantially circular shape that is slightly elongated sideways. An ignition point 11 of a spark plug 10 is positioned so that it faces cavity 17.

The section of projection 16 that intersects with the intake flow coming in from first intake port 61 is cut away all the way to the outer perimeter edge of end surface 5a of piston 5, forming a cut-away section 18. Cut-away section 18 extends along the outer perimeter of piston end surface 5a up to the area under exhaust port 71. An intake flow passage 19 is formed on cut-away section 18. The portion of the piston end surface that forms the bottom surface of intake flow passage 19 is formed as a flat surface all the way to the outer perimeter edge of piston end surface 5a. Intake flow passage 19 is continuous with cavity 17 in the area under exhaust port 71. A portion of intake flow passage 19 under exhaust port 71 forms an entry 20 into cavity 17. As shown in the plan drawing, cavity entry 20 points substantially in the direction of the tangent of the outer perimeter of cavity 17.

As shown in FIG. 4, flat portions 21 are disposed on the bottom surface of cylinder head 3 at the periphery of combustion chamber 1. Flat portions 21 form squish zones when piston 5 reaches top dead center. However, this type of flat portion is not formed at the section where intake flow passage 19 is formed, i.e. between first intake port 61 and exhaust port 71. Intake flow passage 19 is formed at the outer perimeter edge of piston end surface 5a, extending to the outer perimeter surface of combustion chamber 1. This prevents squishing from taking place at intake flow passage 19.

Depressions 22, 22 are formed on end surface 5a of piston 5 to allow intake valves 81, 82 to lift when piston 5 is near the top dead center point.

The following is a description of how the internal combustion engine with two intake ports as described above operates.

When the engine is under a heavy load, both first and second intake valves 81, 82 are active. Thus, intake air flows into combustion chamber 1 from both first and second intake ports 61, 62. This large amount of intake air generates a high output.

When the engine is under a light load, second intake valve 82 is at rest, and only first intake valve 81 is active. Thus, intake air flows into combustion chamber 1 only from first intake port 61. When this is the case, the intake air flowing through second intake passage 122 is let in to first intake passage 121 via connecting aperture 15 and, together with the intake air in first intake passage 121, flows into combustion chamber 1 from first intake port 61. As a result, the flow is relatively fast even though the amount of intake air going into combustion chamber 1 is small. Since both connecting aperture 15 and first intake port 61 point toward the outer perimeter of combustion chamber 1, the intake air flowing into combustion chamber 1 swirls along the outer perimeter of combustion chamber 1, creating a swirl effect.

If projection 16 on piston end surface 5a were to be disposed in the way of first intake port 61, the intake air flowing into combustion chamber 1 from intake port 61 would be obstructed and disturbed by projection 16. However, with this piston 5, the portion of projection 16 that would be in the way of first intake port 61 is cut away, leaving the flow of intake air undisturbed.

In this manner, the intake air flowing from first intake port 61 into combustion chamber 1 passes through intake flow passage 19, which extends from cut-away section 18 of projection 16 to the outer perimeter portion of piston end surface 5a, and flows toward the side below exhaust port 71. Then, this intake air flows through cavity entry 20 and into cavity 17. Since the bottom surface of intake flow passage 19 forms a flat surface that extends from cut-away section 18 of projection 16 to cavity entry 20, the intake air is able to flow very smoothly. Intake flow passage 19, which includes cut-away section 18 of projection 16, extends to the outer perimeter edge of piston end surface 5a. The bottom surface of cylinder head 3 that forms the upper surface of intake flow passage 19 is not formed with a flat portion to form a squish zone. Thus, even when piston 5 approaches top dead center, squishing does not take place at intake flow passage 19, and the intake air flow is prevented from being disturbed by squishing. This prevents the swirl effect formed within combustion chamber 1 from being weakened.

As described above, the intake air flowing on piston end surface 5a flows from cavity entry 20 of intake flow passage 19 into cavity 17. Cavity entry 20 is oriented in the direction of the outer perimeter tangent of cavity 17, which is substantially circular when seen from above. Thus, the intake air flowing into cavity 17 is able to generate an even stronger swirl effect inside cavity 17.

Projection 16 is disposed on end surface 5a of piston 5, and flat portions 21 are disposed on the bottom surface of cylinder head 3 at the periphery of combustion chamber 1. When piston 5 is near top dead center, the volume of combustion chamber 1 is small. As a result, a large portion of the intake air flowing into combustion chamber 1 is concentrated in cavity 17, and cavity 17 is positioned under ignition point 11 of spark plug 10.

Thus, the intake air flowing into combustion chamber 1 is concentrated around ignition point 11 of spark plug 10, and a strong swirl effect is formed there. As a result, the combustion properties are significantly improved, and the air/fuel ratio for the intake air can be increased.

In the embodiment described above, piston 5 is used in an internal combustion engine with two intake ports where intake valve 82 is at rest during light loads. However, the piston according to the present invention is not restricted to this implementation. For example, the present invention can be used in internal combustion engines with two intake ports where both intake valves 81, 82 are always active. In this case, second intake passage 122 can be sealed during light loads. Also, first and second intake ports 61, 62 can be formed pointing in the same direction.

Furthermore, it would also be possible to use an internal combustion engine with a single intake port, where the single intake port is pointing in a direction away from the center of combustion chamber 1.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

As the description above makes clear, the present invention includes a projection and a cavity disposed on an end surface of a piston. A cut-away section is disposed at a section lying in the direction of the intake port. Intake air flowing into the combustion chamber is guided to the outer perimeter of the piston end surface via the cut-away section. The intake air then flows into the cavity, which is disposed away from the cut-away section. Thus, the intake air can be concentrated in the cavity, which is near the ignition point of the spark plug, and the swirl effect generated in the cavity is not weakened by the cut-away section, resulting in the formation of a strong swirl effect. This provides an internal combustion engine having significantly improved, high output, and efficient fuel consumption.

What is claimed is:

1. In an internal combustion engine comprising an intake port on one side of an upper surface of a combustion chamber, said intake port being pointed toward the outer perimeter of said combustion chamber, an exhaust port disposed on the other side, and an ignition point of a spark plug disposed at a central section, a piston comprising:

a projection disposed on an end surface of said piston at a position near a section facing said intake port, said projection extending over said end surface and separating said intake port from said exhaust port;

a cavity disposed at a position facing said ignition point of said spark plug, said cavity including a cavity entry positioned near a section facing said exhaust port;

a cut-away section surrounding said projection and extending from said intake port; and an intake flow passage which follows said cut-away section so that intake air flows horizontally along said cut-away section of said projection around said outer perimeter of said piston end surface and into said cavity via said cavity entry.

2. The piston for internal combustion engines as recited in claim 1 wherein:

said cavity is formed substantially in the shape of a circle when seen from above; and said cavity entry of said intake flow passage is oriented substantially in the direction of a tangent line of said circular cavity.

3. The piston for internal combustion engines as recited in claim 2, wherein a section of said end surface forming a bottom surface of said intake flow passage is formed as a flat surface extending from said cut-away section of said projection to said cavity entry.

4. The piston for internal combustion engines as recited in claim 3 wherein:

said cut-away section of said projection extends to the outer perimeter edge of said piston end surface.

5. The piston for internal combustion engines as recited in claim 4 wherein:

said internal combustion engine comprises an internal combustion engine with two intake ports having a first intake port with an intake valve that is always active and a second intake port with an intake valve that is always at rest during light loads;

a partition wall separating a first and second intake passage, which are continuous with said first and second intake ports respectively, is formed with a connecting aperture providing continuity between said intake passages; and said cut-away section of said projection is oriented in the direction of the flow going through said connecting aperture.

6. The piston for internal combustion engines as recited in claim 2 wherein:

said internal combustion engine comprises an internal combustion engine with two intake ports having a first intake port with an intake valve that is always active and a second intake port with an intake valve that is always at rest during light loads;

a partition wall separating a first and second intake passage, which are continuous with said first and second intake ports respectively, is formed with a connecting aperture providing continuity between said intake passage; and said cut-away section of said projection is oriented in the direction of the flow going through said connection aperture.

7. The piston for internal combustion engines as recited in claim 2 wherein:

said cut-away section of said projection extends to the outer perimeter edge of said piston end surface.

8. The piston for internal combustion engines as recited in claim 7, wherein said internal combustion engine comprises an internal combustion engine with two intake ports having a first intake port with an intake valve that is always active and a second intake port with an intake valve that is always at rest during light loads;

a partition wall separating a first and second intake passage, which are continuous with said first and second intake ports respectively, is formed with a connecting aperture providing continuity between said intake passage; and said cut-away section of said projection is oriented in the direction of the flow going through said connecting aperture.

9. The piston for internal combustion engines as recited in claim 1 wherein a section of said end surface forming a bottom surface of said intake flow passage is formed as a flat surface extending from said cut-away section of said projection to said cavity entry.

10. The piston for internal combustion engines as recited in claim 9 wherein:

said internal combustion engine comprises an internal combustion engine with two intake ports having a first intake port with an intake valve that is always active and a second intake port with an intake valve that is always at rest during light loads;

a partition wall separating a first and second intake passage, which are continuous with said first and second intake ports respectively, is formed with a connecting aperture providing continuity between said intake passage; and said cut-away section of said projection is oriented in the direction of the flow going through said connection aperture.

11. The piston for internal combustion engines as recited in claim 9 wherein:

said cut-away section of said projection extends to the outer perimeter edge of said piston end surface.

12. The piston for internal combustion engines as recited in claim 11 wherein:

said internal combustion engine comprises an internal combustion engine with two intake ports having a first intake port with an intake valve that is always active and a second intake port with an intake valve that is always at rest during light loads;

a partition wall separating a first and second intake passage, which are continuous with said first and second intake ports respectively, is formed with a connecting aperture providing continuity between said intake passage; and said cut-away section of said projection is oriented in the direction of the flow going through said connection aperture.

13. The piston for internal combustion engines as recited in claim 1 wherein:

said cut-away section of said projection extends to the outer perimeter edge of said piston end surface.

14. The piston for internal combustion engines as recited in claim 13 wherein:

said internal combustion engine comprises an internal combustion engine with two intake ports having a first intake port with an intake valve that is always active and a second intake port with an intake valve that is always at rest during light loads;

a partition wall separating a first and second intake passage, which are continuous with said first and second intake ports respectively, is formed with a connecting aperture providing continuity between said intake passage; and said cut-away section of said projection is oriented in the direction of the flow going through said connection aperture.

15. The piston for internal combustion engines as recited in claim 1 wherein:

said internal combustion engine comprises an internal combustion engine with two intake ports having a first intake port with an intake valve that is always active and a second intake port with an intake valve that is always at rest during light loads;

a partition wall separating a first and second intake passage, which are continuous with said first and second intake ports respectively, is formed with a connecting aperture providing continuity between said intake passage; and said cut-away section of said projection is oriented in the direction of the flow going through said connection aperture.

16. The piston for internal combustion engines as recited in claim 1, wherein said internal combustion engine comprises an internal combustion engine with two intake ports having a first intake port with a first intake valve that is always active and a second intake port with a second intake valve that is always at rest during light loads.

17. The piston for internal combustion engines as recited in claim 1, wherein a center of said cavity is positioned away from said ignition point of said spark plug toward the side under said exhaust port.

18. The piston for internal combustion engines as recited in claim 1, wherein said cavity has an oval shape that is slightly elongated toward the side under said exhaust port when seen from above.

19. The piston for internal combustion engines as recited in claim 17, wherein said cut-away section of said projection extends to the outer perimeter edge of said piston end surface.

20. The piston for internal combustion engines as recited in claim 18, wherein said cut-away section of said projection extends to the outer perimeter edge of said piston end surface.

21. The piston for internal combustion engines as recited in claim 17, wherein said internal combustion engine comprises an internal combustion engine with two intake ports having a first intake port with a first intake valve that is always active and a second intake port with a second intake valve that is always at rest during light loads;

a partition wall separating a first and second intake passage, which are communicating with said first and second intake ports respectively, has a connecting aperture intercommunicating said first intake passage and said second intake passage; and said cut-away section of said projection is oriented in a direction of the flow going through said connecting aperture.

22. The piston for internal combustion engines as recited in claim 18, wherein said internal combustion engine comprises an internal combustion engine with two intake ports having a first intake port with a first intake valve that is always active and a second intake port with a second intake valve that is always at rest during light loads;

a partition wall separating a first and second intake passage, which are communicating with said first and second intake ports respectively, has a connecting aperture intercommunicating said first intake passage and said second intake passage; and said cut-away section of said projection is oriented in a direction of the flow going through said connecting aperture.

23. The piston for internal combustion engines as recited in claim 18, wherein a center of said cavity is positioned away from said ignition point of said spark plug toward the side under said exhaust port.

24. The piston for internal combustion engines as recited in claim 18, wherein said cavity entry of said intake flow passage is oriented substantially in the direction of a tangent line of said oval cavity.

25. The piston for internal combustion engines as recited in claim 24, wherein a center of said cavity is positioned away from said ignition point of said spark plug toward the side under said exhaust port.

26. The piston for internal combustion engines as recited in claim 25, wherein said cut-away section of said projection extends to the outer perimeter edge of said piston end surface.

27. The piston for internal combustion engines as recited in claim 26, wherein said internal combustion engine comprises an internal combustion engine with two intake ports having a first intake port with a first intake valve that is always active and a second intake port with a second intake valve that is always at rest during light loads;

a partition wall separating a first and second intake passage, which are communicating with said first and second intake ports respectively, has a connecting aperture intercommunicating said first intake passage and said second intake passage; and said cut-away section of said projection is oriented in a direction of the flow going through said connecting aperture.

28. The piston for internal combustion engines as recited in claim 3, wherein said internal combustion engine comprises an internal combustion engine with two intake ports having a first intake port with a first intake valve that is always active and a second intake port with a second intake valve that is always at rest during light loads;

a partition wall separating a first and second intake passage, which are communicating with said first and second intake ports respectively, has a connecting aperture intercommunicating said first intake passage and said second intake passage; and said cut-away section of said projection is oriented in a direction of the flow going through said connecting aperture.

* * * * *